United States Patent [19]

Karasawa et al.

[11] Patent Number: 5,311,238
[45] Date of Patent: May 10, 1994

[54] ZOOM LENS BEARING CAMERA

[75] Inventors: Takayuki Karasawa; Hiroshi Ikeda, both of Nagano, Japan

[73] Assignee: Chinon Kabushiki Kaisha, Nagano, Japan

[21] Appl. No.: 3,933

[22] Filed: Jan. 13, 1993

Related U.S. Application Data

[63] Continuation of Ser. No. 749,338, Aug. 23, 1991, abandoned.

[30] Foreign Application Priority Data

Aug. 24, 1990 [JP] Japan ................... 2-224059

[51] Int. Cl.$^5$ ............................................. G03B 13/36
[52] U.S. Cl. .................................. 354/400; 354/413; 354/195.1
[58] Field of Search .................. 354/400, 402, 145.1, 354/413, 195.1

[56] References Cited

U.S. PATENT DOCUMENTS

| | | |
|---|---|---|
| 4,878,080 | 10/1989 | Takehana et al. |
| 4,896,177 | 1/1990 | Kazami et al. ................ 354/145.1 |
| 5,070,352 | 12/1991 | Kotani et al. ................... 354/402 |
| 5,089,841 | 2/1992 | Yamada ........................... 354/402 |
| 5,132,718 | 7/1992 | Fujino et al. ................... 354/413 |
| 5,227,831 | 7/1993 | Miyazaki et al. ............... 354/402 |

FOREIGN PATENT DOCUMENTS

| | | |
|---|---|---|
| 3828587 | 9/1989 | Fed. Rep. of Germany . |
| 4104518 | 9/1991 | Fed. Rep. of Germany . |
| 1232315 | 9/1989 | Japan . |
| 262510 | 3/1990 | Japan . |

Primary Examiner—Russell E. Adams

[57] ABSTRACT

A zoom lens bearing camera comprises a zoom lens having a full-aperture F number which changes as a zoom focal length is changed, the zoom focal length being controllable to a desired value through electrical driving, a ranging unit for measuring a distance to a subject, a metering unit for measuring brightness of a scene containing the subject, an electronic flash unit for supplying as an auxiliary light source to the subject, a sensitivity detecting unit for detecting a film exposure sensitivity, a first data table in which optimum zoom focal lengths respectively corresponding to various subject distances are set, a second data table in which optimum zoom focal lenghts respectively corresponding to the various subject distances are set according to a range of the electronic flash, and a zoom focal length determining unit for determining the zoom focal length corresponding to the distance to the subject by selecting the first data table when a quantity of exposure obtained based upon the brightness of the scene measured by the metering unit, the film exposure sensitivity detected by the sensitivity detecting unit, and a full-aperture F number in a selected zoom focal length is not less than a setting value, while selecting the second data table when the quantity of exposure is less than the setting value.

2 Claims, 3 Drawing Sheets

ZOOM LENS BEARING CAMERA

This application is a continuation of application Ser. No. 07/749,338 filed on Aug. 23, 1991, now abandoned.

BACKGROUND OF THE INVENTION

1. Field of the Invention

The present invention relates to a zoom lens bearing camera, and particularly relates to a camera provided with a zoom lens having a full-aperture F number which changes as the focal length is changed, the camera being capable of using an electronic flash as an auxiliary light source, and having an automatic magnification changing function so as to automatically adjust the focal length of the zoom lens correspondingly to the subject distance.

2. Description of the Related Art

As disclosed in Japanese Unexamined Patent Publication No. Hei-1-232315 discloses a Zoom lens bearing camera having an automatic magnification changing function, in which subject distances are measured with respect to at least three points in a photographic angle of view, and the size of the subject occupying the photographic angle of view is judged on the basis of the result of the subject distance measurement, so that the magnification of the zoom lens is changed so as to obtain an optimum zoom focal length in accordance with a preset program.

That is, in such a camera, the subject distances are measured with respect to at least three points, for example, center, right and left points, in a photographic angle of view, and judgment is made as to which one of those three points gives the shortest distance. By use of the photographic focal length of the lens corresponding to this shortest distance and the depth of field in this photographic focal length, the size of the subject is judged on the basis of whether the measured distances with respect to the other points are within this depth of field, and the focal length of the zoom lens is determined in accordance with a predetermined magnification-changing program on the basis of the result of judgment of the size.

In a camera in which the subject distance measurement is performed not with respect to a plurality of points as in the above-mentioned camera, but with respect to only one point, the focal length of a zoom lens is determined simply on the basis of the distance to the subject and an assumed size of the subject in accordance with a variable-magnification program for an upper half-length portrait mode, a full-length portrait mode, etc.

In those methods, there is no special problem when the brightness of a scene including the subject is satisfactory, but if it is dark enough to need to use an electronic flash, underexposure may result, since the focal length of the zoom lens is determined independent of the range of the electronic flash.

Additionally, Japanese Unexamined Patent Publication No. Hei-2-62510 discloses another camera in which, with respect to a zoom focal length set by a photographer in advance, judgment is made as to whether or not underexposure will occur on the basis of the full-aperture F number of the lens in the preset zoom position, the subject distance, and the radiation quantity (guide number: GNo) of an electronic flash, and if there is a possibility of occurrence of underexposure, the lens is automatically zoomed to the wide angle side having a small full-aperture F number.

That is, at the focal length of the zoom lens set by the photographer, it is judged whether or not underexposure will occur on the basis of the effective F number of the lens in the zooming position, the brightness in the photographic angle of view, the subject distance, and the GNo of the electronic flash, and the lens is automatically zoomed to the wide angle side only when it has been proved that underexposure will occur. The above-mentioned judgment is performed every time when zooming drive to the wide angle side is performed in one step, and the zooming of the zoom lens is stopped at the position of the focal length in which the possibility of occurrence of underexposure is removed. If the possibility of occurrence of underexposure is not removed by the zooming to the end of the wide angle side, an alarm signal is produced.

In the above-mentioned camera, it is possible to prevent underexposure from occurring, however, the angle of view may be changed automatically and the intention of the photographer set aside. This is because of a preference, built into the camera, for correct exposure over angle of view.

As has been described above, in a camera equipped with such an automatic magnification changing device, having a zoom lens in which a maximum-aperture F number of a diaphragm (full-aperture F number) changes between its wide angle side and its telephoto side, there is no special problem when the scene is bright, but various problems occur as mentioned above if the scene is so dark as to necessitate use of an electronic flash. This is because the focal length is set by optimizing the angle of view while disregarding the range of the electronic flash.

The guide number of an electronic flash is given by the equation GNo=(range)×(F number). Accordingly, the diaphragm is used in its fully opened state when a subject having a large range (long distance) is to be taken. In a zoom lens having full-aperture F numbers which differ between its wide angle side and its telephoto side, the longest range of electronic flash on the wide angle side is different from that on the telephoto side. In other words, in the case of electronic flash photography at a certain photographic distance, it is possible for underexposure to occur on the telephoto side while proper exposure is obtained on the wide angle side.

SUMMARY OF THE INVENTION

It is therefore an object of the present invention to solve the foregoing problems in the prior art.

It is another object of the present invention to provide a zoom lens bearing camera, in which the focal length of the zoom lens can be automatically adjusted to an optimum value corresponding to the subject distance, and in which, in the case of electronic flash photography, underexposure can be prevented by considering the range of the electronic flash when deciding the zoom focal length, and the zoom focal length can be obtained which is close to an ideal automatic magnification-changing program.

In order to attain the above objectives, according to the present invention, the zoom lens bearing camera comprises: a zoom lens having a full-aperture F number which changes as a zoom focal length is changed, the zoom focal length being controllable to a desired value through electrical driving; a ranging means for measuring a distance to a subject; a metering means for measuring brightness of a scene containing the subject; an electronic flash means as an auxiliary light source to the subject; a sensitivity detecting means for detecting a film exposure sensitivity; a first data table in which optimum zoom focal lengths corresponding to various subject distances are set; a second data table in which optimum zoom focal lengths corresponding to the various subject distances are set on the basis of the range of the electronic flash; and a zoom focal length determining means. When the quantity of exposure obtained on the basis of the brightness of the scene measured by the metering means, the film exposure sensitivity detected by the sensitivity detecting means, and the full-aperture F number in a selected zoom focal length is not less than a setting value, the zoom focal length determining means determines a focal length by selecting the first data table. When the quantity of exposure is less than the setting value, the zoom focal length determining means determines a focal length by selecting the second data table.

The zoom focal length determining means functions to recalculate the quantity of exposure based upon the full-aperture F number in the zoom focal length obtained from the second data table. When there is a surplus in the recalculated quantity of exposure, then the zoom focal length determining means changes the zoom focal length to the long focus side from the previously decided zoom focal length.

According to the present invention, the brightness of a scene containing a subject is measured by the metering means or photometer, and if the brightness of the scene is satisfactory, the optimum zoom focal length corresponding to the subject distance is determined by use of the first data table. If the scene is so dark as to need electronic flash photography, the zoom focal length is determined by use of the second data table, thereby taking into account the range of electronic flash. Accordingly, there is no possibility of underexposure, and it is possible to obtain a proper zoom focal length corresponding to the subject distance.

In addition, in the case of electronic flash photography according to the present invention, the quantity of exposure is computed on the basis of the zoom focal length decided from the second data table, and the obtained zoom focal length is shifted to the long focus side if the quantity of exposure has a surplus, thereby obtaining a zoom focal length closer to an ideal automatic magnification-changing program.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

An embodiment of the present invention will be described with reference to the drawings.

Figure 1:
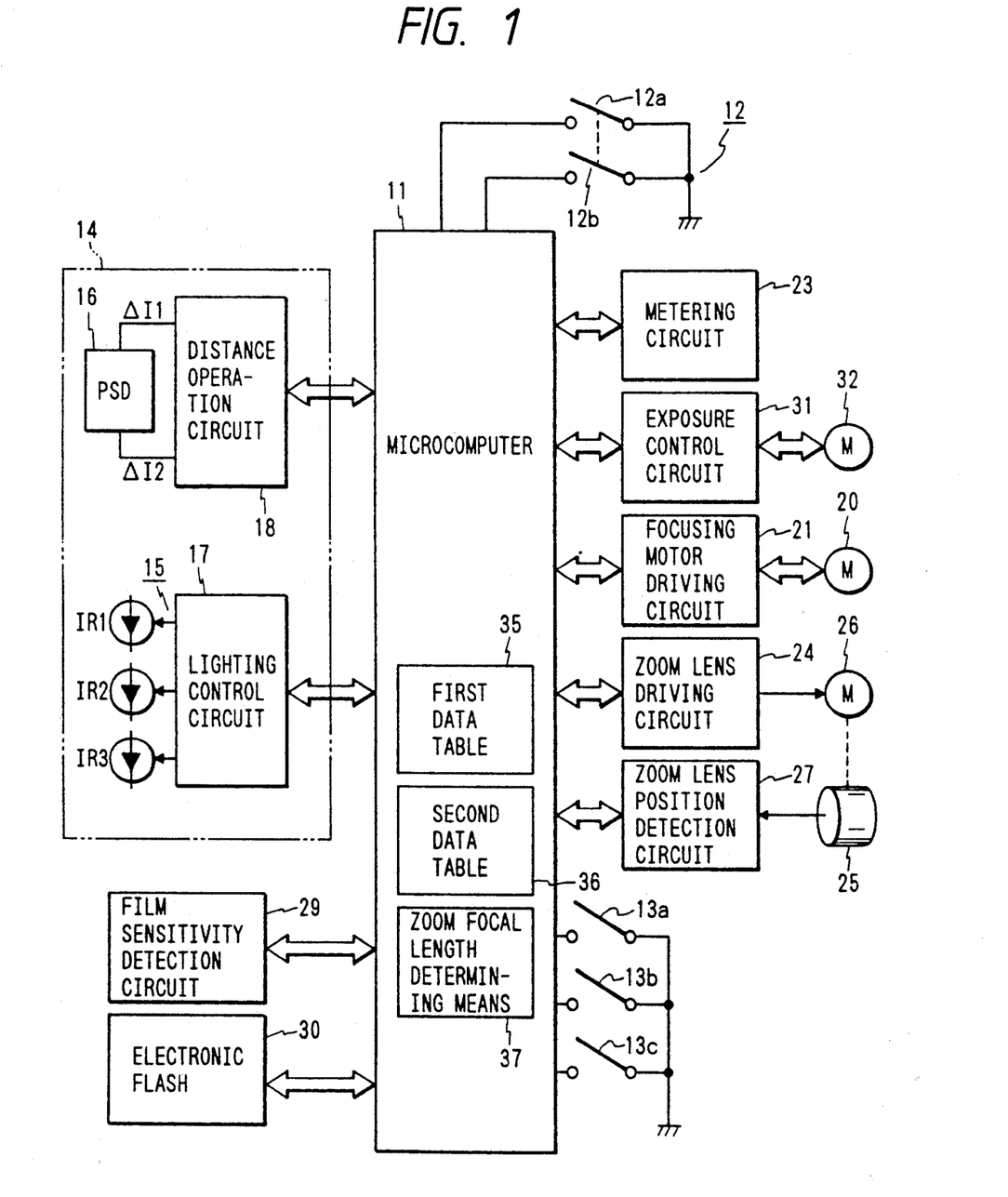
FIG. 1 is a block diagram illustrating an embodiment of the zoom lens bearing camera according to the present invention.

In FIG. 1, a microcomputer 11 acts as a central control device for controlling the whole of a camera (not shown), the microcomputer 11 being connected to various circuits so as to perform signal giving/receiving with those various circuits and to perform operational processes in accordance with a predetermined program.

A release switch 12 has a two-step structure composed of a first-step operation to turn on a contact 12a by depressing a switch button (not shown) to a predetermined depth, and a second-step operation to turn on a contact 12b by further depressing the switch button. The first-step operation (on-operation of the contact 12a) of the release switch 12 is a preparatory operation instruction for photography. In response to this first-step operation, the microcomputer 11 gives operation instructions such as metering, ranging, focus adjusting, automatic magnification changing, etc., to various circuits. The second-step operation (on-operation of the contact 12b) is to generate an instruction to execute real photography, that is, to start exposure.

A zoom mode switch 13 is provided for selecting the adjusting mode of the angle of view of a zoom lens, i.e., either an automatic operation (automatic magnification changing) or a manual operation. Turning on a contact 13a permits manual adjustment of the angle of view; turning on a contact 13b permits the zoom lens to be driven in the direction of the telephoto side (TELE); and turning on a contact 13c permits the zoom lens to be driven in the direction to the wide angle side (WIDE).

A ranging device 14 measures a subject distance by a trigonometric system by use of a light emission source 15 and a light detection element 16. The light emission source 15 has three infrared luminous elements IR1, IR2 and IR3, for respectively measuring subject distances with respect to a plurality of points (in this embodiment, three points, that is, the center, right and left points) in an angle of view. Infrared luminous elements IR1, IR2 and IR3 are controlled so as to emit light sequentially by a lighting control circuit 17. Light detection element 16 comprises a linear semiconductor position sensing device (hereinafter abbreviated to "PSD"). PSD 16 detects the infrared light emitted from the light emission source 15 and reflected off of a subject, and outputs detection currents $\Delta I1$ and $\Delta I2$ corresponding to the subject distance from the incident position thereof for each of the above-mentioned points. Those detection currents $\Delta I1$ and $\Delta I2$ are converted into m-bit distance data by a distance operation circuit 18, and supplied to the microcomputer 11.

The microcomputer 11 controls the operation timing of the lighting control circuit 17, the distance operation circuit 18, etc., so as to perform sequential ranging with respect to the three points in the angle of view as mentioned above, and receives and stores the distance data, as m-bit digital data, measured with respect to the above-mentioned points. The microcomputer 11 judges which one of the points (the center, right or left point) gives the shortest-distance datum of those measured distance data, on the basis of the lighting timing of the infrared luminous elements IR1, IR2 and IR3. Further, on the basis of the measured distance data with respect to the respective points obtained in the above-mentioned manner, the microcomputer 11 controls a drive circuit 21 for driving a focusing motor 20 so as to perform focus adjustment corresponding to the shortest distance datum. In addition, on the basis of the photographic focal length corresponding to this shortest distance datum and the depth of field in this focal length, the microcomputer 11 judges whether the measured distances with respect to the other points fall within this depth of field or not to judge the dimensions of an object to be measured.

A metering circuit 23 is a photometer for measuring the brightness in the photographic angle of view. The metering curcuit 23 is operated by a metering instruction from the microcomputer 11 so as to supply the microcomputer 11 with a measurement result based on the output of a built-in light detection element.

A zoom lens driving circuit 24 is provided. In response to a zooming instruction from the microcomputer 11, the zoom lens driving circuit 24 controls a motor 26 to displace a zoom ring 25 of the zoom lens having a magnification changing function. The displacement of the zoom ring 25 makes the zoom focal length of the zoom lens change correspondingly. This zoom focal length is detected by a zoom lens position detection circuit 27 for detecting the position of the zoom ring 25, and the detected zoom focal length is supplied to the microcomputer 11.

A film sensitivity detection device 29 reads a DX code provided on a cartridge of a film so as to detect the ISO sensitivity of the film and supplies the detected data of ISO sensitivity to the microcomputer 11.

An electronic flash 30 is provided. The lighting of the electronic flash 30 is controlled correspondingly to the photometry result of the metering circuit 23 and the film sensitivity detection result of the film sensitivity detection device 29, and the light emitting timing of the electronic flash 30 is controlled by the microcomputer 11.

Figure 3:
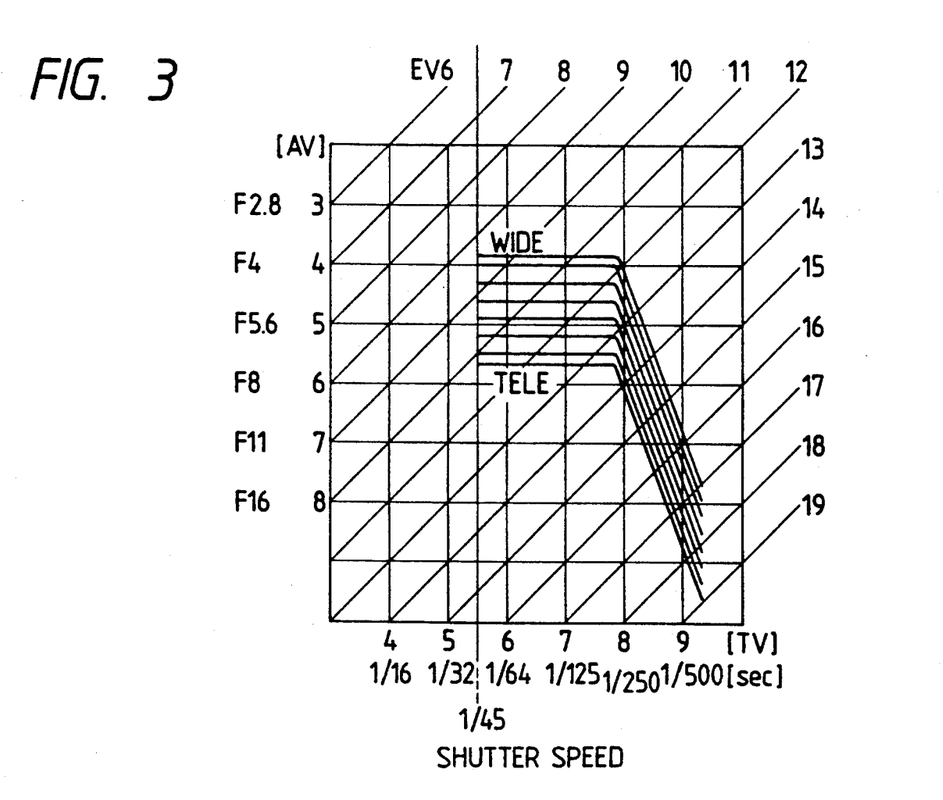
FIG. 3 is a characteristic diagram illustrating an interlocking characteristic of a shutter shown in FIG. 1.

An exposure control circuit 31 is responsive to an exposure instruction from the microcomputer 11 to control a stepping motor (hereinafter simply referred to as "a shutter") 32 as a diaphragm and shutter driving mechanism. The shutter 32 is a program shutter having an interlocking characteristic as shown in FIG. 3.

The microcomputer 11 has a first data table 35 in which optimum zoom focal lengths corresponding to subject distances obtained from the ranging circuit 14 are set. In addition, the microcomputer 11 has a second data table 36 in which optimum zoom focal lengths corresponding to the subject distances obtained from the ranging circuit 14 are set on the basis of the range of light of the electronic flash 30. In addition, the microcomputer 11 has a zoom focal length determining means 37. When the quantity of exposure calculated from the output of the metering circuit 23, the film sensitivity detection result of the film sensitivity detection device 29 and the full-aperture F number at the zoom focal length selected from the first data table 35 is not less than a predetermined value, the zoom focal length determining means 37 determines a focal length corresponding to the above-mentioned subject distance by selecting the first data table 35. When the quantity of exposure is less than the predetermined value, the zoom focal length determining means 37 determines a focal length by selecting the second data table 36.

TABLE 1

(a)

| Subject distance [m] | Zoom step with respect to each combination of ranging information at three (center, left and right) points | | | | | | |
|---|---|---|---|---|---|---|---|
| | X X X | X X ○ | X ○ X | X ○ ○ | ○ X X | ○ X ○ | ○ ○ X | ○ ○ ○ |
| 1.089 | | 0 | 1 | 0 | 0 | 0 | 0 | 0 |
| 1.151 | | 0 | 1 | 0 | 0 | 0 | 0 | 0 |
| 1.222 | | 0 | 2 | 0 | 0 | 0 | 0 | 0 |
| 1.302 | | 0 | 3 | 0 | 0 | 0 | 0 | 0 |
| 1.395 | | 0 | 4 | 0 | 0 | 0 | 0 | 0 |
| 1.504 | | 0 | 4 | 0 | 0 | 0 | 0 | 0 |
| 1.632 | | 0 | 5 | 0 | 0 | 0 | 0 | 0 |
| 1.785 | | 0 | 6 | 0 | 0 | 0 | 0 | 1 |
| 1.972 | | 0 | 7 | 1 | 0 | 0 | 1 | 2 |
| 2.205 | | 1 | 7 | 2 | 1 | 1 | 2 | 3 |
| 2.504 | | 1 | 7 | 3 | 1 | 1 | 3 | 3 |
| 2.902 | | 2 | 7 | 3 | 2 | 2 | 3 | 4 |
| 3.456 | | 3 | 7 | 4 | 3 | 3 | 4 | 4 |
| 4.280 | | 5 | 5 | 5 | 5 | 5 | 5 | 5 |
| 5.639 | | 6 | 6 | 6 | 6 | 6 | 6 | 6 |
| 8.300 | 7 | 7 | 7 | 7 | 7 | 7 | 7 | 7 |

(b)

| Zoom step | 0 | 1 | 2 | 3 | 4 | 5 | 6 | 7 |
|---|---|---|---|---|---|---|---|---|
| Zoom focal length [mm] | 36 | 37.96 | 42.21 | 46.89 | 52.14 | 57.97 | 64.46 | 68 |

As shown in Table 1(a) of the above-mentioned first data table 35, the range of subject distances is divided into 16 increments from 1.089 m to 8.300 m, and in each increment, zoom steps are set corresponding to the size of a subject therein. This size of a subject is determined by the arrangement of marks O and X appearing in a row of three. These marks O and X indicate the relationship among the subject distances measured at the three points (center, left and right, respectively) in a photographic angle of view. The mark O appearing in one or more of the three spots indicates that of the three subject distances, measured at the center, left and right points, the shortest distance measured occurred at the point corresponding to the spot or spots where the O mark appears, or that the distance measured at that point falls within the depth of field of the shortest distance measured. The depth of field of the shortest distance measured is defined as being within a range of two increments of subject distance. The mark X appearing in one or more of the three spots indicates that the distance measured at that point does not come within the depth of field of the shortest distance measured; in other words, the distance measured at that point was located three or more increments of subject distance away from the shortest distance measured.

Therefore, the mark O appearing in two or all three of the spots means that the rate of occupation by a subject in the photographic angle of view is so large that it is not necessary to shift the zoom lens to its telephoto side. When the mark O appears only once and is in either the right or left spot indicates that the intended picture is a composition including the background, and it is therefore unnecessary to shift the zoom lens to the telephoto side. On the contrary, when the mark O appears only once and in the center spot, this means that the rate of occupation by a subject in the angle of view is so small that it is necessary to shift the zoom lens to the telephoto side in comparison with the other compositions.

Figure 2:
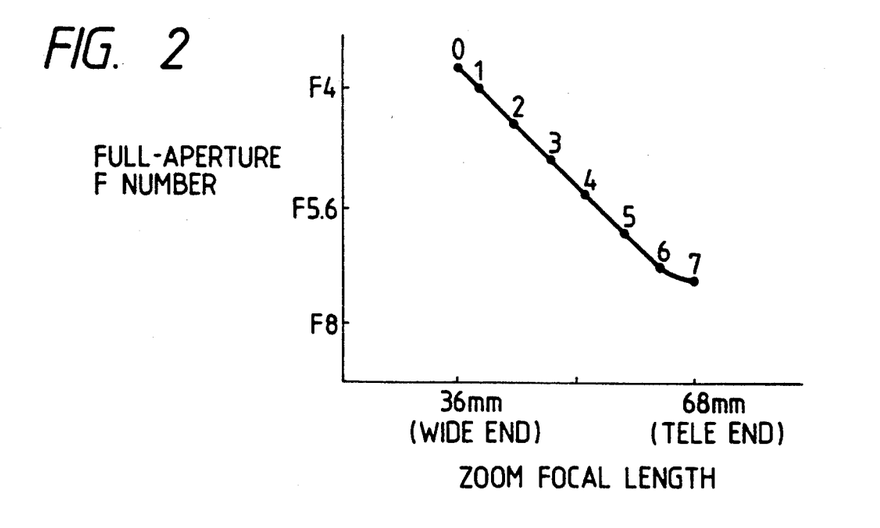
FIG. 2 is a characteristic diagram illustrating the relationship between the full-aperture F number of a zoom lens and the zoom focal length of the same.

Zoom steps (zoom focal lengths) 0 to 7 are set in each of the 16 increments of subject distance as shown in Table 1(a), corresponding to the arrangement of X's and O's. There are eight zoom steps 0 to 7, corresponding to 36 mm to 68 mm, as shown in Table 1(b) and FIG. 2. As the zoom step changes, the full-aperture F number changes as shown in FIG. 2.

telephoto end, as shown in FIG. 3. Further assume that the threshold shutter speed for prevention of camera shake is 1/45 sec.

In a zoom lens having a movable diaphragm position, if the focal length is changed from the short focus end to the long focus end as mentioned above, F number of the zoom lens changes. Since the F number can be obtained by dividing "focal length" by "effective aperture", the F number changes if the mechanical aperture is not changed. In an example shown in FIGS. 2 and 3, the full-aperture F number at a short focal point (36 mm) is F3.77, the full-aperture F number at a long focal point (68 mm) is F7.12. Therefore, for example, assuming the shutter speed is fixed at the 1/45 sec threshold value for prevention of camera shake, and assuming the zoom lens is controlled under the same brightness Lv9.5, the F number of the zoom lens changes from F3.77 to F3.975, . . . , F7.12 as the zoom focal length changes from its short focus end to its long focus end. This change of the full-aperture F number causes a difference $\Delta Ev$ between Ev values in each zoom step. Therefore, it is darker in the long focus end than in the short focus end by $\Sigma \Delta Ev = 1.875$ as shown in Table 3, so that the interlocking range varies as shown in FIG. 3.

TABLE 2

| Subject distance [m] | Zoom step with respect to each combination of ranging information at three (center, left and right) points | | | | | | | |
|---|---|---|---|---|---|---|---|---|
| | X X X | X X O | X O X | X O O | O X X | O X O | O O X | O O O |
| (a) ISO 100 | | | | | | | | |
| 3.456 | | 3 | 4 | 4 | 3 | 3 | 4 | 4 |
| 4.280 | | 2 | 2 | 2 | 2 | 2 | 2 | 2 |
| 5.639 | | 0 | 0 | 0 | 0 | 0 | 0 | 0 |
| 8.300 | 0 | 0 | 0 | 0 | 0 | 0 | 0 | 0 |
| (b) ISO 200 | | | | | | | | |
| 5.639 | | 2 | 2 | 2 | 2 | 2 | 2 | 2 |
| 8.300 | 0 | 0 | 0 | 0 | 0 | 0 | 0 | 0 |
| (c) ISO 400 | | | | | | | | |
| 5.639 | | 5 | 5 | 5 | 5 | 5 | 5 | 5 |
| 8.300 | 2 | 2 | 2 | 2 | 2 | 2 | 2 | 2 |
| (d) ISO 1000 | | | | | | | | |
| 8.300 | 5 | 5 | 5 | 5 | 5 | 5 | 5 | 5 |

In the second data table 36, although the zoom steps are set in each subject distance increment corresponding to subject size in the same manner as in first data table 35, the zoom steps (zoom focal length) for a far subject are set on the basis of the range of the electronic flash 30. For example, in the data table for film sensitivity ISO 100 shown in Table 2(a), zoom steps for a far subject having a subject distance of 3.456 m or more are wider than that of the first data table on the basis of the electronic flash range. This is because, as will be described in detail below, the wide angle side has a smaller full-aperture F Number than the telephoto side, so that underexposure does not occur. In Table 2(a), subject distances less than 3.456 m are omitted since they are the same as those in Table 1(a) of the first data table 35.

The data tables for the film sensitivities ISO 200, 400 and 1000 respectively are shown in Tables 2(b), 2(c) and 2(d) in the same manner as described above for ISO 100 film sensitivity.

Next, the interlocking characteristic of the shutter 32 shown in FIG. 3 will be described. First, assume that the guide number of the electronic flash 30 in this embodiment is GNo=11. And assume that the full-aperture F number of the zoom lens is F3.77 in its wide angle end and F7.12 in its telephoto end. The interlocking range of the shutter 32 ranges from Ev9.5 to Ev17 in the wide angle end and from Ev11.375 to Ev18.875 in the

TABLE 3

| Zoom step | Zoom focal length [mm] | Full-aperture F number | $\Delta Ev$ [Ev] |
|---|---|---|---|
| Light ↑ 0 | 36 | 3.77 | |
| | | | 0.153 |
| ↓ 1 | 37.96 | 3.975 | |
| Dark | | | 0.306 |
| 2 | 42.21 | 4.42 | |
| | | | 0.303 |
| 3 | 46.89 | 4.91 | |
| | | | 0.306 |
| 4 | 52.14 | 5.46 | |
| | | | 0.306 |
| 5 | 57.97 | 6.07 | |
| | | | 0.306 |
| 6 | 64.46 | 6.75 | |
| | | | 0.154 |
| 7 | 68 | 7.12 | $\Sigma \Delta Ev = 1.875$ |

Figure 4:
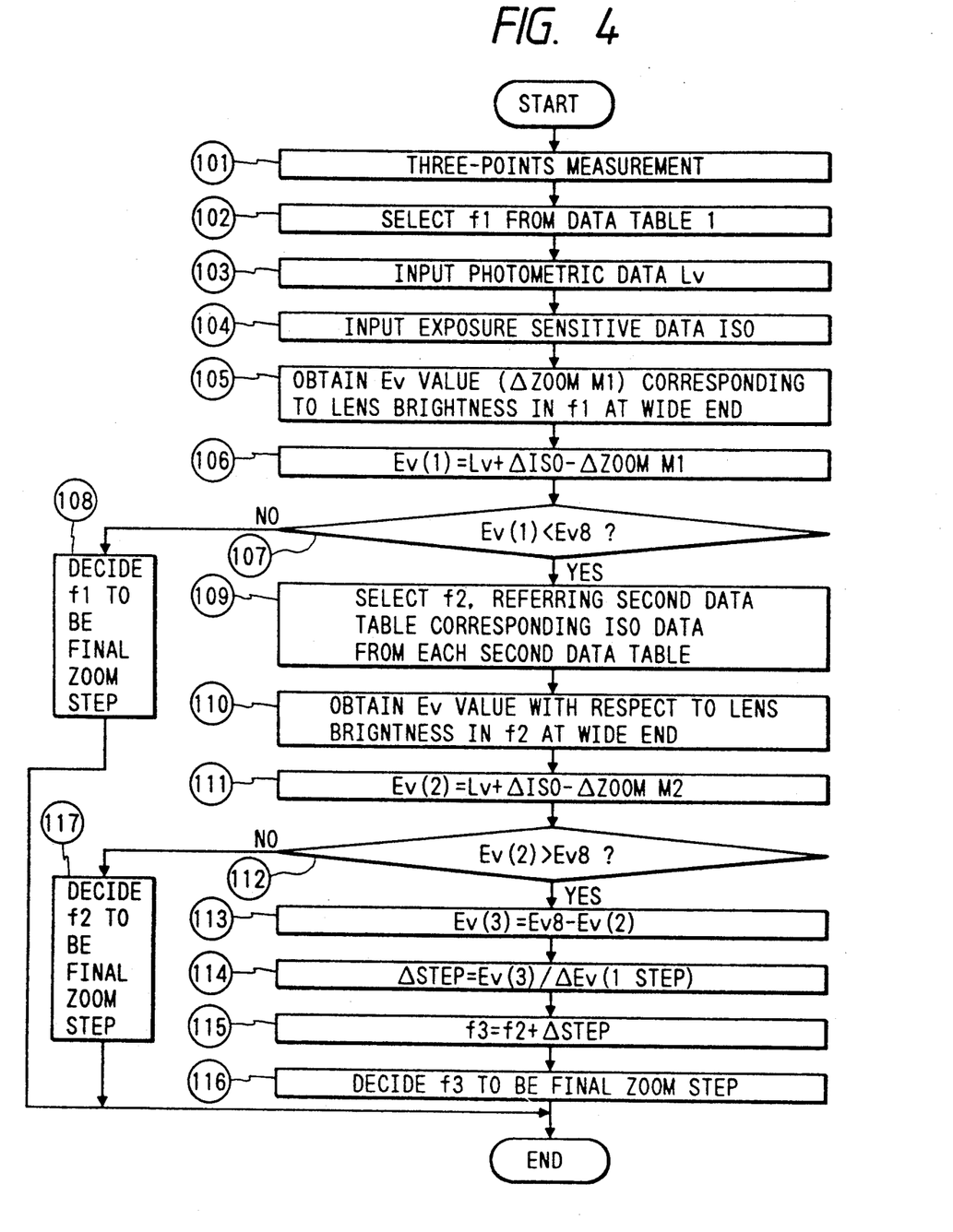
FIG. 4 is a flow chart for explaining the operation of the present invention.

Next, camera operation will be described as shown in the flow chart in FIG. 4.

Assume that an automatic magnification changing mode is selected by the zoom mode switch 13 in FIG. 1 (all the contacts 13a to 13c being in the off state). Under this condition, if the release switch 12 is manipulated on its first-step so as to turn on the contact 12a, the microcomputer 11 actuates the ranging circuit 14 so as to receive measured distance data with respect to the three points in the angle of view (Step 101). By use of the measured distance data (subject distance), the microcomputer 11 selects the optimum zoom step f1 from Table 1(a) of the first data table 35 (Step 102).

Next the microcomputer 11 receives the photometric data Lv from the metering circuit 23 and the exposure sensitivity data Δ ISO from the film sensitivity detection means 29 (Steps 103 and 104), and further receives the deviation of brightness with respect to the short focus end in the zoom step f1 selected from the first data table 35, thereby obtaining an Ev value ΔZOOM1 (Step 105) so as to judge whether the Ev value of the brightness of a photographic scene $Ev_{(1)} = Lv + \Delta ISO - \Delta ZOOM1$ is not less than the lowest Ev value (Ev8) limited by the truncation second as a threshold to prevent camera shake of a shutter (Steps 106 and 107).

The above-mentioned lowest Ev value was determined as follows. Since the interlocking range of the shutter is Ev9.5 on the short focus end side as shown in FIG. 3, the lowest Ev value was made Ev8 in the consideration of the latitude for the proper quantity of exposure of a film.

Therefore, for example, in the case of using a film of ISO 400 and controlling the zoom lens under the brightness of the photometric value Lv7, the interlocking range is Ev9 at the short focus end, which is larger than the above-mentioned lowest Ev value (Ev8) and the result of the judgment in Step 107 is "NO". However, under the same conditions, with using a film of ISO 100, the interlocking range is Ev7, less than the lowest Ev value (Ev8) and the result of the judgment in Step 107 is "YES". As another example, in the case of using a film of ISO 100 and controlling the zoom lens under the brightness of Lv9, the interlocking range is Ev9 at the short focus end, which is more than the lowest Ev value (Ev8); but at the long focus end, the full-aperture F number is darker by about 1.875 Ev (ΣΔEv), so that the interlocking range is Ev7.125 (9−1.875), which is less than the lowest Ev value (Ev8).

As a result of the above judgment, in the case of more than the lowest Ev value (Ev8), the result of the judgment in Step 107 is "NO", the brightness of the photographic scene is satisfactory and there are no problems, so that the microcomputer 11 judges that the zoom step f1 selected from the first data table 35 is optimum, determines this zoom focal length finally and enters the zoom driving operation.

On the contrary, in the case of less than the lowest Ev value (Ev8), the photographic scene is so dark as to need an auxiliary light source such as an electronic flash. In this embodiment, since the latitude of exposure is set to −2 Ev, electronic flash photography interlocking ranges in the respective focal lengths are shown in Table 4.

TABLE 4

| Zoom step | Zoom focal length | Full-aperture F number | Electronic flash range (−ZEV) | | | |
|---|---|---|---|---|---|---|
| | | | ISO 100 | ISO 200 | ISO 400 | ISO 1000 |
| 0 | 36 (mm) | 3.77 | 5.84 (m) | 8.26 (m) | 11.68 (m) | 18.81 (m) |
| 1 | 37.96 | 3.975 | 5.53 | 7.82 | 11.06 | 17.81 |
| 2 | 42.21 | 4.42 | 4.98 | 7.04 | 9.96 | 16.04 |
| 3 | 46.89 | 4.91 | 4.48 | 6.34 | 8.96 | 14.43 |
| 4 | 52.14 | 5.46 | 4.03 | 5.70 | 8.06 | 12.98 |
| 5 | 57.97 | 6.07 | 3.62 | 5.12 | 7.24 | 11.66 |
| 6 | 64.46 | 6.75 | 3.26 | 4.61 | 6.52 | 10.50 |

TABLE 4-continued

| Zoom step | Zoom focal length | Full-aperture F number | Electronic flash range (−ZEV) | | | |
|---|---|---|---|---|---|---|
| | | | ISO 100 | ISO 200 | ISO 400 | ISO 1000 |
| 7 | 68 | 7.12 | 3.09 | 4.37 | 6.18 | 9.95 |

Tables 2(a)–2(d) of the second data table 36 for the respective film sensitivities contain data which satisfy those interlocking ranges, and which have been converted into the nearest ones to the numeral values of Table 1(a) of the first data table 35. The microcomputer 11 selects one of those Tables 2(a) to 2(d) corresponding to the ISO data of a film to be used to thereby decide a zoom step corresponding to the subject distance (Step 109). Although the subject distance is generally regarded as the value of center distance in an AF-step, a real subject distance has a certain width as shown in Table 5, so that the data in Table 4 have been calculated by use of the switching points shown in Table 5.

TABLE 5

| AF-STEP | Subject distance | AF switching point |
|---|---|---|
| 1 | 1.089 m | |
| | | 1.119 m |
| 2 | 1.151 | |
| | | 1.185 |
| 3 | 1.222 | |
| | | 1.261 |
| 4 | 1.302 | |
| | | 1.347 |
| 5 | 1.395 | |
| | | 1.447 |
| 6 | 1.504 | |
| | | 1.565 |
| 7 | 1.632 | |
| | | 1.705 |
| 8 | 1.785 | |
| | | 1.874 |
| 9 | 1.972 | |
| | | 2.082 |
| 10 | 2.205 | |
| | | 2.345 |
| 11 | 2.504 | |
| | | 2.688 |
| 12 | 2.902 | |
| | | 3.154 |
| 13 | 3.456 | |
| | | 3.823 |
| 14 | 4.280 | |
| | | 4.865 |
| 15 | 5.639 | |
| | | 6.712 |
| 16 | 8.300 | |

For example, the zoom step at the subject distance 4.28 m in Table 2(a) of the second data table 36 will becomes 3 if it is simply selected from the above-mentioned Table 4, but the subject distance 4.28 m is an AF-step center vale as shown in Table 5, and the longest distance in this case is 4.865 m according to Table 5. Accordingly, the zoom step becomes 2 when FIG. 4 is reviewed in this regard. That is, in the case of less than the lowest Ev value (Ev8), the microcomputer 11 selects and uses an optimum data Table (for example, Table 2(a)) of the second data table 36 correspondingly to ISO data, and selects a zoom step f2 which is the nearest one to the previous data selected from Table 1(a) of the first data table 35 and which satisfies the range of the electronic flash.

In addition, the microcomputer 11 obtains the deviation of brightness ΔZOOM2 with respect to the short focus end in the full-aperture F number in the selected zoom step f2 (Step 110), and recalculates the Ev value on the basis of the photometry information Lv from the metering circuit 23 and the film sensitivity data ΔISO (Step 111), thereby judging whether this Ev value is beyond the lowest Ev value or not (Step 112).

For example, in the case of the subject distance 4.28 m, first, the zoom step 5 is selected in Table 1(a) of the first data table 35. At this time, under the condition of using a film of ISO 100 and under the control in the brightness Lv9, the Ev value is 7.625 which is less than the lowest Ev value. Therefore, Table 2(a) of the second data table 36 is used and the zoom step 2 is selected. The recalculated Ev value (Steps 110 and 111) is 8.5 ("YES" in Step 112) which is larger by 0.5 Ev than the lowest Ev value Ev8 to cause overexposure (Step 113). That is, a surplus is produced in the quantity of exposure.

In this case, as is understood from the above-mentioned Table 3, even if the zoom focal length is corrected to the long focus side by one step, it is possible to satisfy the lowest Ev value. A correctable step number ΔSTEP can be obtained by dividing the quantity of excess over the lowest Ev value, that is $Ev_{(3)}$, by the Ev value changed by shifting by one zoom step, that is, $\Delta Ev_{1STEP)}$ (Step 114). By adding the correctable step number ΔSTEP obtained thus to the above-mentioned selected zoom step number f2 (correcting to the telephoto side), a zoom step f3 causing no overexposure is determined (Steps 115 and 116).

If the Ev value does not exceed the lowest Ev value in the judgment of Step 112, the zoom step f2 selected in Table 2(a) of the second data table 36 is determined to be a final zoom step (Step 117).

The microcomputer 11 obtains the quantity of drive for the zoom lens on the basis of the zoom focal length finally determined in such a manner. The present zoom lens position is supplied from the zoom lens position detection circuit 27 of FIG. 1, and the microcomputer 11 supplies the quantity of drive to the zoom lens driving circuit 24 so as to cause the zoom lens driving circuit 24 to drive the zoom lens motor 26 to thereby displace the zoom ring 25 to the determined zoom focal length.

A fixed electronic flash having a guide number (incident angle which remains constant despite changing of the zoom focal length is used in the above embodiment. However, an electronic flash having a variable radiation angle structure in which the guide number can be changed correspondingly to the change of the zoom focal length may be used. In addition, the ranging circuit 14 is not limited to the illustrated embodiment, and any circuit having any configuration may be used. In addition, the present invention may be applied to a camera using an image pickup device as well as a still camera using 35 mm film.

As has been described, according to the present invention, magnification changing of a zoom focal length is executed in accordance with a normal program under the condition of light emission satisfying required exposure, while under the condition of light emission not satisfying required exposure, the zoom focal length determination takes into consideration the range of electronic flash. It is thereby possible to correct underexposure due to a shortage in the range of electronic flash to the utmost limit, using means for automatically changing the zoom focal length, to thereby make it possible to obtain a superior picture scene. In this case, since such a magnification changing control is performed when a user selects an automatic magnification changing mode, the user's will is respected. In addition, surveys of users' preference have shown that most users would choose a picture of proper exposure, in which a far subject is small, over an underexposed picture in which a far subject is large. Accordingly, the present invention effects this preference.

What is claimed is:

1. A zoom lens bearing camera comprising:

a zoom lens having a full-aperture F number which changes as a zoom focal length is changed, wherein said zoom focal length is variable;

ranging means for measuring a distance to a subject;

metering means for measuring brightness of a scene containing said subject;

electronic flash means for supplying an auxiliary light source to said subject;

sensitivity detecting means for detecting a film exposure sensitivity;

a first data table including optimum zoom focal lengths corresponding to various subject distances;

a second data table including optimum zoom focal lengths corresponding to said various subject distances according to a range of said electronic flash means; and zoom focal length determining means for determining said zoom focal length corresponding to said distance to said subject from said first data table when a quantity of exposure obtained, based upon said brightness of said scene measured by said metering means, said film exposure sensitivity detected by said sensitivity detecting means, and a full-aperture F number in a selected zoom focal length, is not less than a predetermined exposure value, and form said second data table when said quantity of exposure is less than said predetermined exposure value.

2. The zoom lens bearing camera of claim 1, wherein said zoom focal length determining means calculates a new quantity of exposure according to the full-aperture F number of said zoom focal length obtained form said second data table, and changes said determined zoom focal length to a long focus side when a surplus in the new quantity of exposure exists.

* * * * *

UNITED STATES PATENT AND TRADEMARK OFFICE
CERTIFICATE OF CORRECTION

PATENT NO. : 5,311,238
DATED : May 10, 1994
INVENTOR(S) : Karasawa, et al.

It is certified that error appears in the above-indentified patent and that said Letters Patent is hereby corrected as shown below:

Column 12, Line 47, delete "form" and insert --from--.

Signed and Sealed this

Eighteenth Day of April, 1995

Attest:

BRUCE LEHMAN

Attesting Officer

Commissioner of Patents and Trademarks